(12) United States Patent
Bresler

(10) Patent No.: US 9,031,344 B2
(45) Date of Patent: May 12, 2015

(54) MOBILE DEVICE FOR MEASURING IMAGE QUALITY

(75) Inventor: Yoav Bresler, Tel-Aviv (IL)

(73) Assignee: Hewlett-Packard Industrial Printing Ltd., Netanya (IL)

( * ) Notice: Subject to any disclaimer, the term of this patent is extended or adjusted under 35 U.S.C. 154(b) by 108 days.

(21) Appl. No.: 13/450,032

(22) Filed: Apr. 18, 2012

(65) Prior Publication Data

US 2013/0279823 A1 Oct. 24, 2013

(51) Int. Cl.
*G06K 9/40* (2006.01)
*G06K 9/03* (2006.01)
(52) U.S. Cl.
CPC ..................................... *G06K 9/036* (2013.01)
(58) Field of Classification Search
None
See application file for complete search history.

(56) References Cited

U.S. PATENT DOCUMENTS

| | | | |
|---|---|---|---|
| 6,275,600 B1 * | 8/2001 | Banker et al. | 382/112 |
| 6,571,000 B1 | 5/2003 | Rasmussen et al. | |
| 6,591,011 B1 * | 7/2003 | Nielsen | 382/218 |
| 7,254,254 B2 * | 8/2007 | Ueda et al. | 382/112 |
| 7,418,114 B2 * | 8/2008 | Murakami | 382/112 |
| 7,643,656 B2 * | 1/2010 | Ueda | 382/112 |
| 2006/0056732 A1 * | 3/2006 | Holmes | 382/286 |
| 2008/0013848 A1 * | 1/2008 | Wu et al. | 382/254 |
| 2008/0080790 A1 * | 4/2008 | Hori et al. | 382/300 |
| 2008/0247660 A1 * | 10/2008 | Zhang et al. | 382/254 |
| 2009/0185204 A1 * | 7/2009 | Wu et al. | 358/1.9 |
| 2009/0274342 A1 * | 11/2009 | Wu et al. | 382/112 |
| 2011/0064278 A1 * | 3/2011 | Wu et al. | 382/112 |
| 2012/0033238 A1 * | 2/2012 | Liu | 358/1.9 |

OTHER PUBLICATIONS

Tuceryan et al., Texture Analysis, 1998, The Handbook of Pattern Recognition and Computer Vision (2nd Edition), by C. H. Chen, L. F. Pau, P. S. P. Wang (eds.), World Scientific Publishing Co., pp. 207-248.*
Fan et al., Robust Estimation of Print Mottle, 2008, Proc. of SPIE-IS&T Electronic Imaging, SPIE vol. 6808, pp. 680808-1-680808-7.*
Per-Åke Johansson, "Optical homogeneity of prints", PhD thesis, Royal Institute of Technology, Stockholm 1999.
International Standard ISO/IEC 13660*; Sep. 1, 2001; International Organization for Standardization; *publication of 1996 draft.
M. Fahlcrantz and P. A. Johansson, "A comparison of different print mottle evaluation models", in 56th Annual Technical Conference of the Technical Association of the Graphic Arts, San Antonio, USA, pp. 511-525, 2004.
John C. Briggs , "Application Note: Graininess Measurements on Halftones", Quality Engineering Associates (QEA) MA/USA, 2002.

(Continued)

*Primary Examiner* — Barry Drennan
*Assistant Examiner* — Guillermo Rivera-Martinez
(74) *Attorney, Agent, or Firm* — Hewlett-Packard Patent Department

(57) ABSTRACT

A mobile device and method for measuring image quality parameters, the device including a digital camera configured to capture one or a plurality of images, a processor configured to select one or a plurality of pairs of points from each image of the one or plurality of images, each pair of points connectable by a line, the processor further configured to compute one or a plurality of image quality parameters from at least one of the lines, and the processor further configured to compute a representative image quality parameter from the image quality parameters, and an output unit configured to communicate one or a plurality of representative image quality parameters.

14 Claims, 5 Drawing Sheets

(56) References Cited

OTHER PUBLICATIONS

M. Fahlcrantz et al., "Evaluating colour print mottle", Advances in Printing and Media Technology: vol. XXXIII; 2007, pp. 151-164.

I. Aizenberg and C. Butakoff, "Frequency domain median-like filter for periodic and quasi-periodic noise removal", SPIE Proceedings of Image Processing: Algorithms and Systems, 4767, pp. 181-191 (2002).

Vijay V. M., "Wavelet and sine based analysis of print quality evaluations", M.Sc. thesis, Kentucky university, 2003.

Ki-Youn Lee et al., "Characterization of '2D noise' print defect", Proc. of SPIE-IS&T Electronic Imaging, SPIE vol. 7242-07 (2009).

"DPM 100—Digital Pocket Microscope": http://www.gardco.com/pages/optical/mc/dpm100.cfm; last accessed Apr. 18, 2012.

\* cited by examiner

MOBILE DEVICE FOR MEASURING IMAGE QUALITY

BACKGROUND

In quality control instances, particularly in quality control of printed images, it may be typical to quantitatively assess the amount of grain, i.e. extent of graininess, e.g., the extent to which the image, or an image of a substance appears to be composed of grain-like particles, and/or amount of mottle, i.e. mottledness, e.g., spotty or patchy color within an image.

In some examples, it may be desired to assess graininess and mottledness in the field, or on the manufacturing floor, where a dedicated measurement device is not immediately present, and when results need to be found immediately.

One way to assess graininess is human metrology. However, in the field, on a short notice, and with untrained personnel, there may be some use for a standardizable machine vision approach.

BRIEF DESCRIPTION OF THE DRAWINGS

Examples are described in the following detailed description and illustrated in the accompanying drawings in which.

Figure 1A:
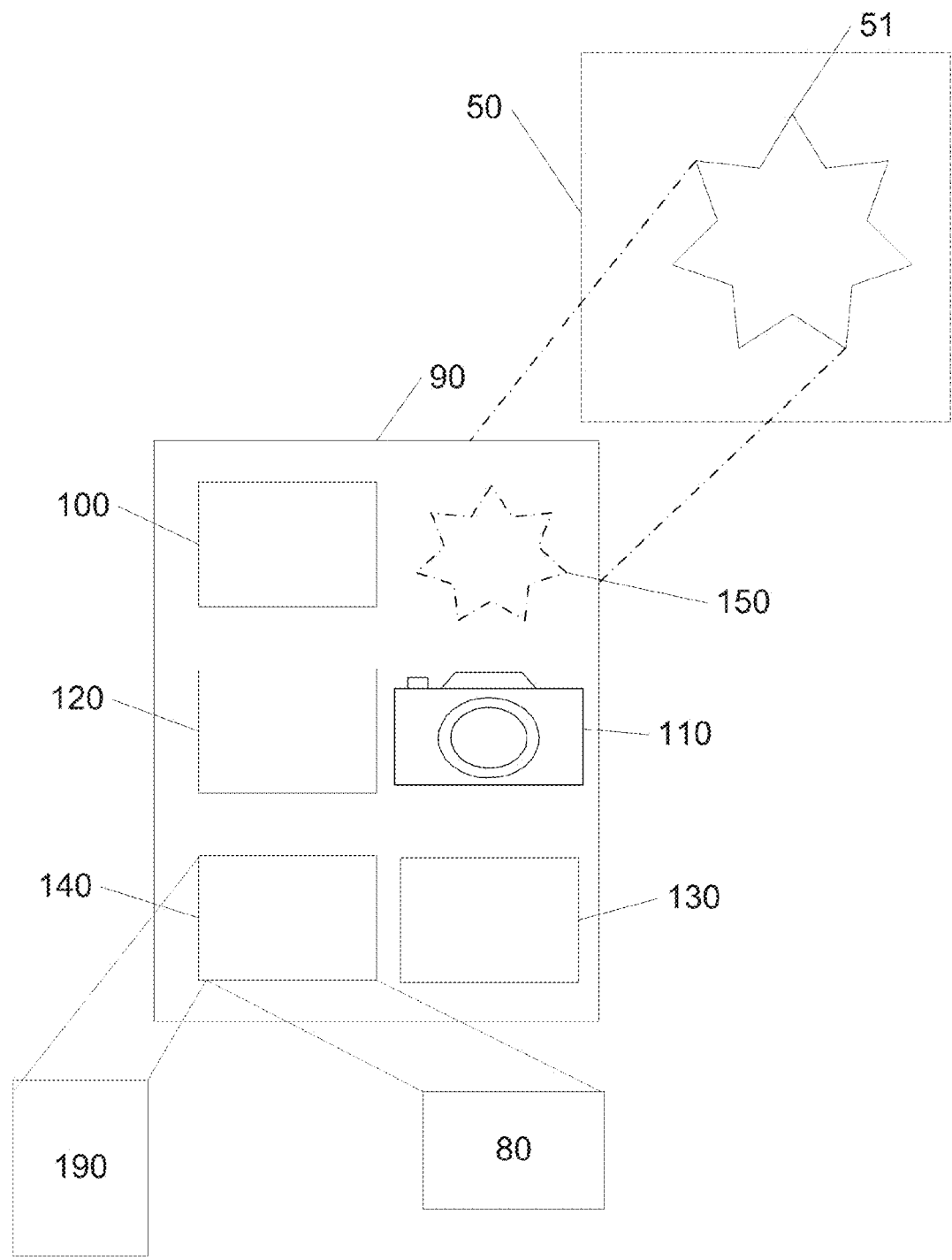
FIG. 1a is a schematic illustration of a portable device for measuring image quality according to an example.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the methods and apparatus. However, it will be understood by those skilled in the art that the present methods and apparatus may be practiced without these specific details. In other instances, well-known methods, procedures, and components have not been described in detail so as not to obscure the present methods and apparatus.

Although the examples disclosed and discussed herein are not limited in this regard, the terms "plurality" and "a plurality" as used herein may include, for example. "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding". "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

FIG. 1a is a schematic illustration of a portable device for measuring image quality according to an example.

Typically a device 90, in some examples, a portable device, e.g., a mobile device, e.g., a smartphone may be configured to operate a software application, an application. In some examples, the application may include a non-transitory computer readable medium comprising instructions.

In some examples, an application 100 is configured to operate on common mobile operating systems (OS) used by smartphones include Apple's ADS, Google's Android, Microsoft's Windows Phone, RIM's BlackBerry OS, and embedded Linux distributions such as Maemo and MeeGo.

Typically smartphones independent of the operating system will allow for advanced application programming interfaces (APIs) for running third-party applications. APIs may typically be source code-based specifications intended to be used as an interface by software components to communicate with each other. An API may include specifications for routines, data structures, object classes, and variables. These APIs may allow those applications or applications, e.g., application 100 to integrate with the smartphone's OS.

In some examples, a smartphone running the Android operating system, or a smartphone running other know operating systems, may be configured to run an application 100.

Typically, device 90 may be a smartphone with an integrated, or in some examples, a coupled digital camera 110, other cameras may also be used. In some examples the camera may be in wireless communication with the smartphone. In some examples, the smartphone may have a flash associated with digital camera 110.

Digital camera 110, when operating in conjunction with the application, may be configured to capture one or a plurality of images 150, where image 150 is a digitally captured representation of an area 51.

In some examples, area 51 may be part of a larger printed image 50, the user analyzing the images 150 representing area 51 within a larger image for image quality. In some examples the user may examine one or a plurality of areas 51, capturing one or a plurality of images 150 for one or a plurality of areas 51.

Typically, the size of area 51 may be constrained by an angle of viewing. In some examples, area 51 may be constrained by focusing capabilities of digital camera 110.

In some examples, a lens may be placed in front of the camera. Typically the lens may be a magnifying lens, e.g., a magnifying glass, someone's glasses, a lens taken from apiece of equipment such as a CD player, and/or any lens to be found in the field. In some examples, the lens may be placed in from of digital camera 110 to reduce the magnitude of area 51.

In some examples, area 51 may be a representative area of substance, the user analyzing image 150, as representative of area 51, or lamer area 50, for quality control.

Typically, environmental variations will not affect the relative consistency of the results, e.g., the output of application 100 may stay relatively the same from location to location. Typically, human user variations will not affect the relative consistency of results of application 100.

Typically application 100 will output valve that may be communicated to an individual who is not at the location where the digital camera is capturing image 150.

In some examples, application 100 may have algorithms that allow application 100 to function consistently independent of digital camera's 110 rotations, or, in some examples, independently of an image's 150 rotation.

In some examples, application 100 may have algorithms that allow application 100 to function relatively consistently independent of the hardware associated with or comprising device 90.

In some examples, application 100 may be configured to filter out high frequency noise, as described below.

In some examples, application 100 may be configured to filer out low frequency noise, e.g., illumination variations, as described below.

In some examples, application 100 may be configured to have linear complexity, or near linear complexity, e.g., the running time of the algorithm tends to increases linearly with the size of the input.

Typically, linear complexity, or near-linear complexity allows application 100 to have minimal processing requirements, and allows, in some examples, application 100 to be computationally quick independent of hardware and/or other platform limitations of device 90.

In some examples, the integrated or coupled digital camera 110 may be configured to run under the control of application 100. In some examples, the image acquired by digital camera 110 is typically configured to be of 5 to 10 megapixels in size.

Typically, a megapixel may refer to one million pixels, and the term pixel typically refers to a single scalar element of a multi-component representation, e.g., a photosite in the camera sensor context. The term megapixel may not only be used in referring to the number of pixels in an image, but in some examples, may also be used to express the number of image sensor elements of digital camera 110, or the number of display elements of digital displays.

In some examples, device 90 may contain digital camera 110. Currently there, are in the market, many cameras with various resolutions, all of which may be used. As an example consider camera 110 that makes a 2580×2048 pixel image, digital camera 110 may typically uses a few extra rows and columns as sensor elements and may be commonly said be classed as a 5.2 or 5.3 megapixel camera sensor depending on whether the number reported is the "effective" or the "total" pixel count.

Typically, digital camera 110 may use photosensitive electronics, either a charge-coupled device (CCD) or a complementary metal-oxide-semiconductor (CMOS) image sensor. The photosensitive electronics, consisting of a large number of single sensor elements, may record a measured intensity level.

In some examples, the sensor array in digital camera 110 may be covered with a patterned color filter mosaic having red, green, and blue regions, e.g., in the Bayer filter arrangement, where a Bayer filter arrangement may refer to a block of four filters which are arranged in the order of blue, green, green and red.

Typically digital camera 110 may interpolate the color information of neighboring sensor elements, through a process called demosaicing, to create the final image. These sensor elements are often called "pixels", even though they typically only record 1 channel (only red, or green, or blue) of the final color image.

Typically, when a sensor element records 1 channel (only red, or green, or blue) of the final color image, two of the three color channels for each sensor need to be interpolated. In some examples, when two of the three color channels for each sensor need to be interpolated, the N-megapixel camera that produces an N-megapixel image, may provide only one-third of the information that an image of the same size could get from a scanner or other optical device, In some examples, digital camera 110 may be configured to take images containing more pixels, in some examples, digital camera 110 may be configured to take pictures containing fewer pixels. In some examples, many images are taken in an infinite loop, until a user quits or exits application 100.

In some examples, digital camera 110 may be configured to capture image 150. Typically application 100 is configured to operate digital camera 110 in a macro mode. In some examples, captured image 150 may be compressed, e.g., as a JPEG. JPEGs, and other commonly use methods of lossy compression for digital photography may allow fir the compression to be adjusted, allowing for a selectable tradeoff between storage size and image quality. Typically, JPEG typically achieves a 10 to 1 compression with little perceptible loss in image quality. Lossy compression algorithms in general for image compression compress data by discarding, i.e., losing, some of it. The compression algorithms aim to minimize the amount of data that needs to be held, handled, and/or transmitted by the smartphone and/or other devices 90.

In some examples, captured image 150 may not be compressed. When captured image 150 is compressed, in some examples it can be decompressed by requesting a service from the operating system's kernel, e.g., a system call. Typically, the operating system executes at the highest level of privilege, and allows applications to request services requiring those privileges via system calls, which are often executed via interrupts, e.g., the interrupt automatically puts a processor into some required privilege level, and then passes control to the operating system's kernel, which determines whether the calling program should be granted the requested service, e.g., a decompression of an image 150. If the service is granted, the kernel executes a specific set of instructions over which the calling program has no direct control, returns the privilege level to that of the calling program, and then returns control to the calling program.

Typically, once image 150 is captured on digital camera 110, the green channel Tay be obtained or extracted from the image. Typically, a digital camera may have some multiple of green receptors relative to red and blue receptors. In some mobile operating systems, e.g., on the android mobile operating system, an image may be obtainable in a YCbCr format. Typically YCbCr, Y'CbCr, or Y Pb/Cb Pr/Cr, also written as YCBCR or Y'CBCR is a family of color spaces used as a part of the color image pipeline in digital photography where Y' is the luma component and CB and CR are the blue-difference and red-difference chroma components. In some examples, Y'CbCr is an encoding ROB information in color space. Typically, the actual color displayed may depend on the actual ROB primaries used to display the signal. Therefore a value expressed as Y'CbCr may be predictable only if standard RGB primary chromaticities are used. Where, in some operating systems, the reconstruction algorithm for interpolating over the color channels may not be known, only one channel may be used. Typically, when the reconstruction algorithm for interpolating over the color channels is not known, the green channel is extracted and all other channels are ignored.

Typically, when the reconstruction algorithm for interpolating over the color channels is not known and the green channel is extracted with all other channels ignored application 100 may apply algorithms to determine graininess to gray level grain or green level grain and typically not to grain in other color channels.

In some examples, when analyzing image 150 a green channel is selected and a red and a blue channel are discarded. Typically, when the green channel is selected and the red and the blue channels are discarded the image quality parameter is computed only for the green channel.

In some examples, luminescence (Y) channel is selected and color blue (Cb) and color red (Cr) information is discarded. Typically, when luminescence (Y) channel is selected and color blue (Cb) and color red (Cr) information is discarded the image quality parameter is computed only of the luminance of image 150.

Typically, image processing may be do by processor 130 on a thread that is separate from a graphical user interface (GUI).

In some examples the infinite loop may include the following: Capture image via digital camera 110, fill image buffer in digital camera 110; Calculate parameters, as described below; Output parameters; Repeat, as described below.

A memory unit 120 is typically configured to store captured images. Memory unit 120 may also be configured to store outputted parameters list 80, in some examples a list of computed image quality parameters described below. Memory unit 120 may typically be the onboard memory of a smartphone or other device on which application 100 is operating, in some examples, memory unit 120 may be an external memory unit such as a removable flash memory card or other memory units.

Typically, application 100 uses sufficient memory to save the individual images. Typically, application 100 does not require substantial memory over and above the memory necessary to store the images.

A processor 130 may compute one or a plurality of image quality parameters. Typically, digital processor 130 computes an image quality parameter for one or a plurality of the images. In some examples, digital processor 130 computes an image quality parameter for less than all of the images. In some examples, processor 130 may be a processor that is a component of a smartphone. In some examples, processor 130 may be based on an ARM core, in some examples processor 130 may be in wireless communication with the smartphone.

In some examples, application 100 is configured to solve the algorithms and present a result using even the slow processors running at slow speeds, and without any dedicated hardware acceleration.

An output unit 140, in some examples a monitor or a speaker, or other methods of outputting information, may be configured to communicate said one or a plurality of parameters to a user of application 100 and/or to display an output 190 of an algorithm, the algorithms described below.

Typically, output unit 140 may be the display of the phone, but the result, e.g., one or a plurality of the parameters may also be communicated by radio waves or through a USB connector, or other methods.

Figure 1B:
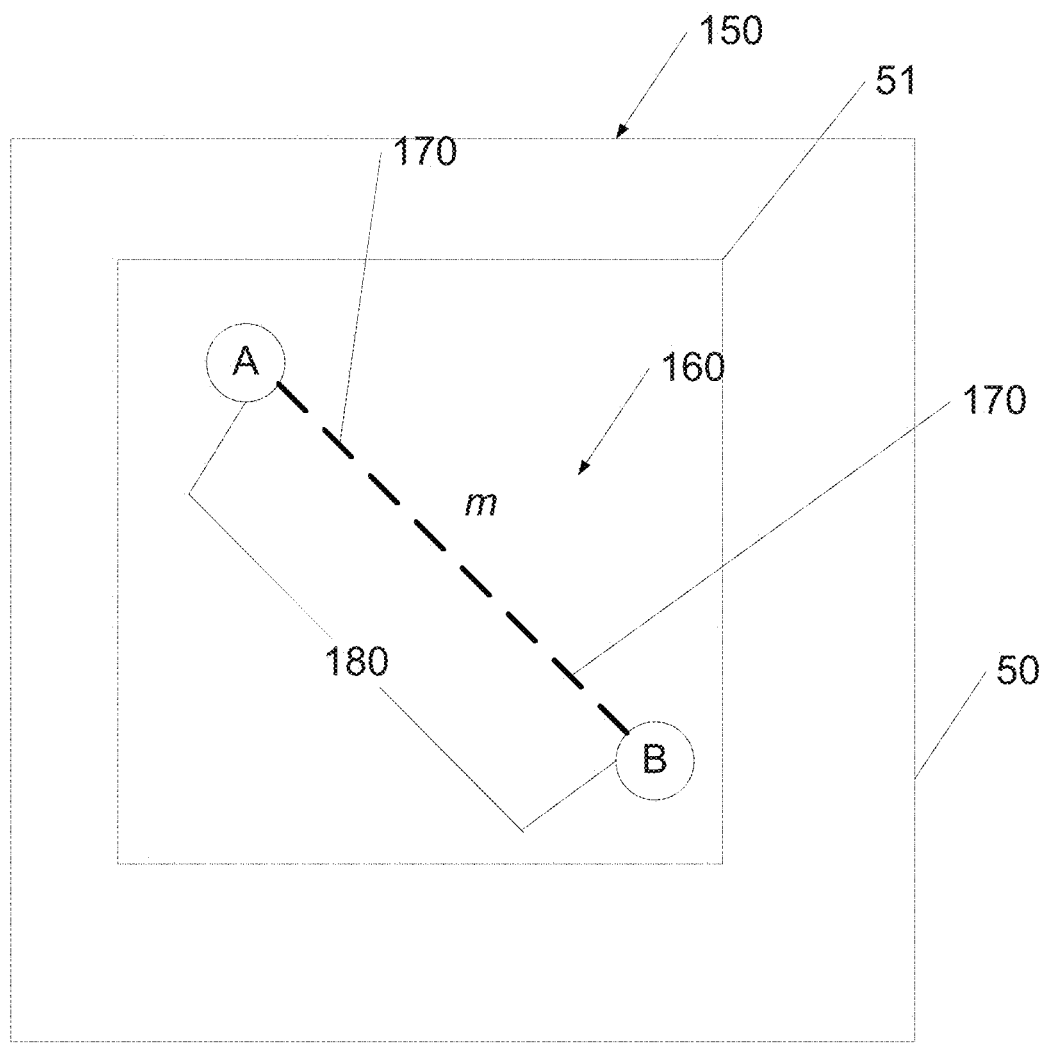
FIG. 1b is a schematic illustration of an image that a portable device for measuring image quality, in accordance with examples, may analyze.

FIG. 1b is a schematic illustration of an image that the device may analyze. Processor 130 is typically configured to select a one or a plurality of pairs of locations, e.g., pairs of points 180, within image 150.

In some examples, processor 130 may implement a loop program in which a pair of points 180, including point A and point B, or coordinates (e.g. in image height and width) is selected using a random number generator. The random lumber generator may be the Java Math.random function, or other random number generators.

The number of iterations for this loop is typically between 100 and 1000 iterations. In some examples, a small number of iterations may be performed to increase the speed of the operation of the algorithm. In some examples, a larger number of iterations may be used to increase accuracy of the algorithm.

Typically, the capabilities of the operating platform and the user's time limitations will be used to determine the number of iterations performed by the algorithm.

In some examples, pairs of points 180, are chosen at random without regard to the angle between the two points. Typically, the slope of a line m between the pair of points 180 will have minimal affect on the result of the algorithm as grain and mottle are typically relatively invariant to rotation.

In some applications, processor 130 may be configured to select prescribed angles between pair of points 180. For example, when measuring banding or strips defects of image quality in image 150 processor 130 may be configured to select vertical or horizontal strips, e.g., slope=0. In some examples the horizontal and/or vertical of an image may be defined in either relation to the image frame, or to the earth's gravity, using an accelerometer, the accelerometer typically a component of the smartphone.

Typically, the distance between point A and point B may be higher than a predetermined number of pixels, for example, the number of pixels within a tenth of a dimension, e.g., width or length, of image 150.

For any given selected pairs of points 180, processor 130 may compute an image quality parameter. Typically, a plurality of parameters may be collected for a plurality of pairs of points 180. Typically, the plurality of parameters may be distilled to compute at least one image quality parameter for outputting to a user.

Typically, the algorithm may initially acquire an image 150. The algorithm may loop several times, computing a parameter for at least one of the pairs of points 180, over a plurality of pairs of points 180, pairs of points 180, e.g., point A and point B in image 150, over a plurality of images 150.

Application 100 may distill many parameters relating to one or a plurality of pairs of points 180 to at least one output parameter. Application 100 may take successive images 150, looping and computing the algorithms and distilling many parameters relating to one or a plurality of pairs of points 180 to at least one output parameter for one or a plurality of the pairs of points 180 for at least one of the images 150, resulting in an output 190 to the user.

Typically a line 160 can be drawn between point A and Point B. Line 160 may be divided into at least two segments 170. Typically, when computing the parameters described above, only locations, e.g., pixels or points in image 150 located at or near line 160 are taken into account, to reduce computation time. Typically, when line 160 is divided, into at least two segments 170 segment image quality parameters may be assessed for at least one or a plurality of segments 170.

Typically, many parameters are distilled for each of the pairs of points 180, generally speaking, in reference to the distribution of their values.

In some examples, for relatively fast results, the median function may be used e.g., Output 190=Median(plurality of parameters for pairs of points 180);

Typically, the outputted parameters may be an outputted parameters list 80, e.g., a list of image quality parameters that is generated by one or a plurality of algorithms, the algorithms described below, in real time, or near real time, typically from a rate of an item per second to an item per ten seconds.

Figure 2:
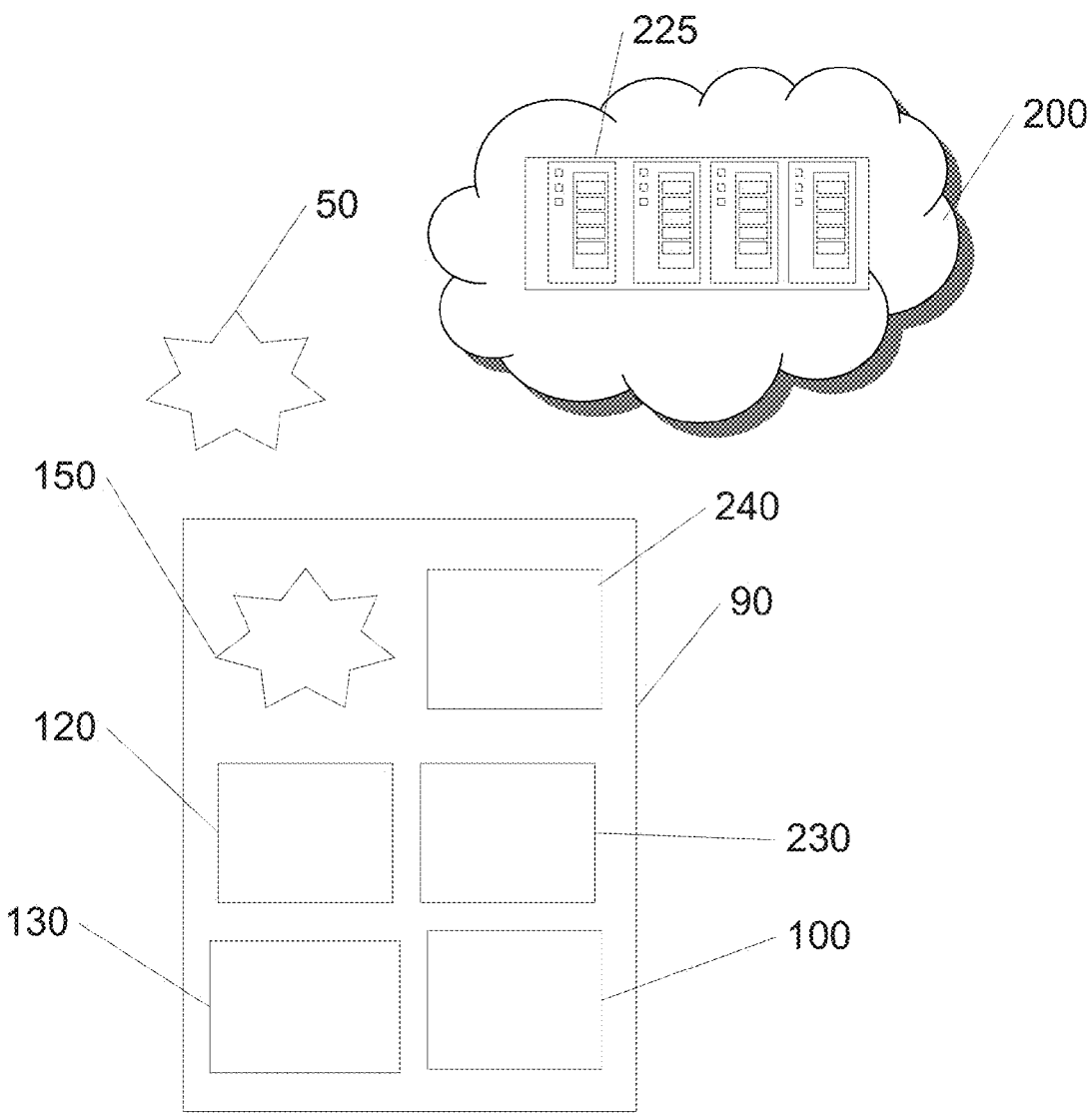
FIG. 2 is a schematic illustration of a method for measuring image quality, according to an example.

FIG. 2 is a schematic illustration of a system for measuring image quality, according to an example.

In some examples, the computations of processor 130 may be implemented on the cloud 200, or other non-local infrastructure, e.g., a remote location from the mobile device, Typically, the computations of processor 130 may be implemented on cloud 200. An outgoing communication unit 240, in some examples, a component of device 90, may communicate image 150, or some by-products of image 150, to cloud 200. Typically, this may be a built-in capability on a mobile phone platform.

Typically, cloud 200, e.g., the internet, comprises processing means such as server farms 225. In some examples server farms 225 may run the computations typically run by processor 130. Results are from server farms 225 running the computations typically run by processor 130 may be communicated to an incoming communication sub-unit 230, also typically a built-in capability of a mobile phone.

Figure 3:
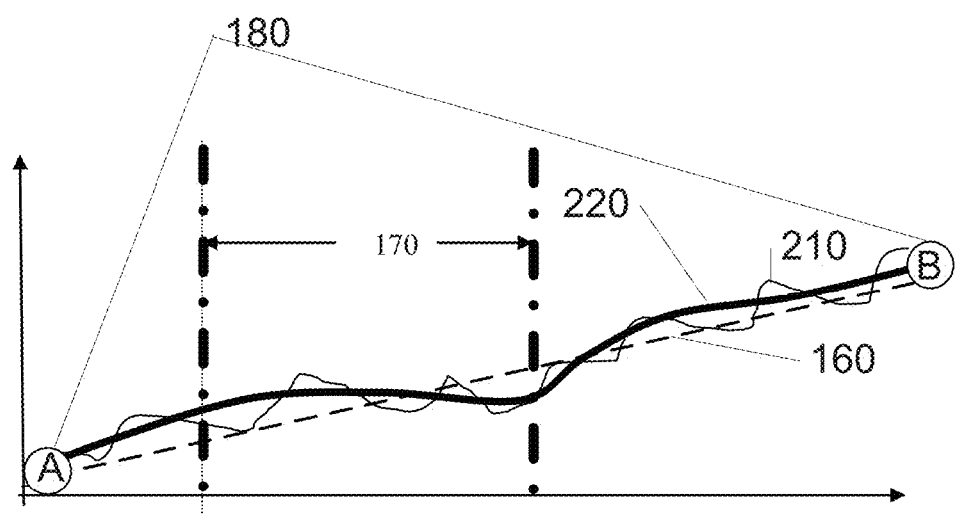
FIG. 3 is a schematic illustration depicting a detected value such as image intensity at a specific location by a portable device for measuring image quality according to an example; and, FIG. 4 is a method for the measurement of parameters of image quality, according to an example.

FIG. 3 is a schematic illustration depicting a detected value such as image intensity at a specific location along line 160 between pair of points 180 shown in FIG. 1b. A signal 210 reflects this image intensity.

Typically a segment 170 is a part of line 160 between points A and point B. The pair of points 180, e.g., point A and point B, representing a set of pixels on image 150, the image captured via digital camera 110.

Typically, a smooth signal 220 may be calculated via algorithms, smooth signal 220 may typically be a product of measured signal 210 of image 150.

Typically, line 160 is divided into one or plurality of segments 170. In some examples, line 160 may be divided into 10 segments, each segment being of equal length. In some examples, each segment may not be of equal length.

In some examples, the size of a segment 170 may typically be 100 pixels. In some examples, line 160 is divided into segments 170, the divisions at coordinates of significant change in signal value.

In some examples, signal 210 may be filtered via algorithms to produce signal 220, typically, by the removal of unwanted frequencies. Typically the algorithm may average together neighboring values of signal 210 using a predetermined weight. In some examples, the weights are selected so that the algorithm would emulate visual perception given image resolution and expected distance from the camera lens on digital camera 110 to the measured image 150, and/or other image capture parameters.

In some examples, a predetermined number of values e.g., 5-10, e.g., 8, are averaged together without weights.

Typically, signal 210 may be subtracted from a polynomial of a small degree fitted to signal 210, where a small degree is typically 1 to 5; e.g. 3, to filter out low frequencies. In some examples, signal 210 may be subtracted from its third polynomial fit, to filter out low frequencies.

Processor 130, described, above, may compute a parameter of image quality per segment 170 of line 160. For the image quality parameters of grain or mottle, the processor typically compute the standard deviation of values in a segment via an algorithm.

Processor 130 distills, in some examples, the many parameters for the many segments 170 on line 160 to one parameter for line 160. In some examples, processor 130 may be configured to calculate the standard deviation for at one or a plurality of segments 170 on line 160. Typically, processor 130 may then calculate the median or minimum standard deviation for the entire line 160, and store that in a memory unit, the memory unit may be the same or similar to the memory unit described above.

Typically, many parameters are distilled the many parameters for the many segments 170 on line 160 to one parameter for line 160 in reference to the distribution of their values. In some examples, for very fast results, the median or minimum functions may be used: e.g., Output 190=Median(plurality of parameters); or
Output 190=Minimum(plurality of parameters);

Typically, the outputted parameters list 80 may be stored, and representative values, in some examples, the most representative values, for a captured image are identified and highlighted. The most representative values are typically the largest values. In similar embodiments a value representing a combined output parameter is distilled for the list, by list operations such as median, mean or maximum Typically, application 100 may calculate a median or a minimum over the results found at one or a plurality of iterations, multiply those results by a factor, in some examples, when image intensity is expressed by numbers between 0 and 255, a factor of 4 may be used to obtain a range of values from 0 to 100. In some examples, processor 130 may be configured to drop insignificant digits.

Typically, application 100 may iterate the previous steps over one or a plurality of sets of points 180 over one or a plurality of images 150 until the user exits application 100.

Figure 4:
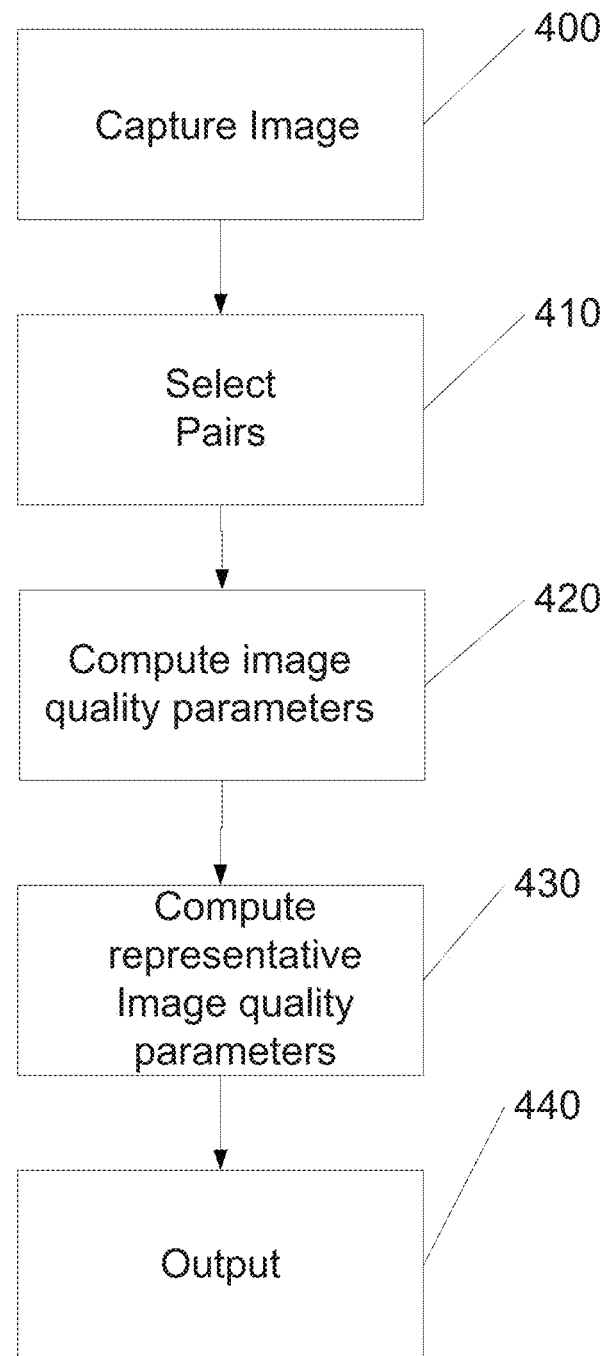

FIG. 4 is a method for the measurement of parameters of image quality, according to an example.

Typically, camera 110 coupled to device 90 is configured to capture one or a plurality of images 150, the images typically representative of an area 51, area 51 maybe representative of a larger image, the larger image being analyzed by a user, as depicted in box 400.

In some examples, a processor 130 within device 90, or in some examples, a processor in a cloud 200, may select one or a plurality of pairs of points 180 from the one or plurality of images 150, the points connectable by a line 160, as depicted by box 410.

In some examples, a processor 130 within device 90, or in some examples, a processor in a cloud 200, may compute one or a plurality of image quality parameters with regard to line 160, as depicted by box 420.

Typically, a processor 130 within device 90, or in some examples, a processor in a cloud 200, may compute one or a plurality of representative image quality parameters from the image quality parameters, as depicted in box 430.

Typically, device 90 will output one or a plurality of representative image quality parameters, or in some examples an output of the algorithm 190, the output of the algorithm 190, or other outputs to be communicated by output unit 140, as depicted in box 440.

Examples may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of examples as described herein. Examples may include an article such as a non-transitory computer or processor readable non-transitory storage medium, such as for example, a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different examples are disclosed herein. Features of certain examples may be combined with features of other examples; thus, certain examples may be combinations of features of multiple examples. The foregoing description of the examples has been presented for the purposes of illustration and description. It is not intended to be exhaustive or to limit. It should be appreciated by persons skilled in the art that many modifications, variations, substitutions, changes, and equivalents are possible in light of the above teaching. It is, therefore, to be understood that the appended claims are intended to cover all such modifications and changes.

What is claimed is:

1. A mobile device comprising:
   a digital camera to capture an image;
   a non-transitory computer-readable medium storing computer-executable code; and
   a processor to execute the computer-executable code to:
      select pair of points from the image, the pair of points connectable by a line;
      divide the line into a plurality of line segments;
      compute a segment image quality parameter for each line segment;
      compute a line image quality parameter for the line from the segment image quality parameters; and
      compute an image quality parameter for the image from the line image quality parameter.

2. The mobile device of claim 1, wherein the processor is to execute the computer-executable code to further filter out high frequency noise from an image captured by the digital camera.

3. The mobile device of claim 1, wherein the processor is to execute the computer-executable code to further filter out low frequency noise from an image captured by the digital camera.

4. A method comprising:
   capturing an image with a digital camera;
   selecting, by a processor, a pair of points from the image, the pair of points connectable by a line;
   dividing, by the processor, the line into a plurality of line segments;
   computing, by the processor, a segment image quality parameter for each line segment;
   computing, by the processor, a line image quality parameter for the line from the segment image quality parameters;
   computing, by the processor, an image quality parameter for the image from the line image quality parameter; and
   outputting, by the processor, the image quality parameter.

5. The method of claim 4, wherein further comprising filtering out high frequency noise from an image captured by the digital camera.

6. The method of claim 4, wherein further comprising filtering out low frequency noise from an image captured by the digital camera.

7. The method of claim 4, wherein the processor is located in a remote location from the mobile device and configured to be in communication with the mobile device.

8. The method of claim 4, wherein a lens is placed in front of the digital camera to capture the image.

9. A non-transitory computer readable medium comprising instructions for measuring image quality parameters, which when executed cause a processor to:
   capture an image;
   select a pair of points from the image, the pair of points connectable by a line;
   divide the line into a plurality of line segments;
   compute a segment image quality parameter for each line segment;
   compute a line image quality parameter for the line from the segment image quality parameters; and
   compute an image quality parameter for the image from the line image quality parameter.

10. The non-transitory computer readable medium of claim 9, wherein the instructions when executed further cause the processor to filter out high frequency noise from an image captured by the digital camera.

11. The non-transitory computer readable medium of claim 9, wherein the instructions when executed further cause the processor to filter out low frequency noise from an image captured by the digital camera.

12. The mobile device of claim 1, wherein the processor is configured to select a plurality of pairs of points from each image in a random manner.

13. The mobile device of claim 1, wherein the line image quality parameter for the line is computed by:
   determining a standard deviation of the segment image quality parameter for each line segment; and
   determining a median of the standard deviations of the segment image quality parameters for the line segments, as the line image quality parameter for the line.

14. The mobile device of claim 1, wherein the line image quality parameter for the line is computed by:
   determining a standard deviation of the segment image quality parameter for each line segment; and
   determining a minimum of the standard deviations of the segment image quality parameters for the line segments, as the line image quality parameter for the line.

* * * * *